United States Patent [19]

Cansell et al.

[11] Patent Number: 4,580,191

[45] Date of Patent: Apr. 1, 1986

[54] DISCHARGE CAPACITOR OF HIGH ENERGY AND HIGH DIRECT VOLTAGE

[75] Inventors: Albert Cansell, Altenstadt; Michel Boussange, Deuil la Barre, both of France

[73] Assignee: O.D.A.M. Office de Distribution d'Appareils Medicaux, Wissembourg, France

[21] Appl. No.: 594,793

[22] Filed: Mar. 29, 1984

[30] Foreign Application Priority Data

Apr. 2, 1983 [DE] Fed. Rep. of Germany ....... 3312076

[51] Int. Cl.$^4$ .......................... H01G 4/08; H01G 4/16
[52] U.S. Cl. ...................................... 361/323; 361/324
[58] Field of Search ............... 361/301, 311, 323, 324, 361/273, 314, 272, 313, 312, 327

[56] References Cited

U.S. PATENT DOCUMENTS

| | | | |
|---|---|---|---|
| 3,588,643 | 6/1971 | Ross | 361/314 X |
| 3,711,746 | 1/1973 | King | 361/314 X |
| 4,323,948 | 4/1982 | Mercier et al. | 361/315 |

FOREIGN PATENT DOCUMENTS

| | | |
|---|---|---|
| 247989 | 7/1966 | Austria . |
| 275690 | 11/1969 | Austria . |
| 2061728 | 6/1971 | Fed. Rep. of Germany ...... 361/323 |
| 2411248 | 9/1974 | Fed. Rep. of Germany . |
| 2527536 | 12/1976 | Fed. Rep. of Germany . |
| 2644167 | 4/1978 | Fed. Rep. of Germany . |
| 1805707 | 2/1980 | Fed. Rep. of Germany . |

OTHER PUBLICATIONS

Defibrillator Capacitors Types BX & FX.
Light Duty High Density Capacitors Type SX.
CSI Capacitors.
Energy Storage/Discharge Capacitors.

*Primary Examiner*—L. T. Hix
*Assistant Examiner*—Douglas S. Lee
*Attorney, Agent, or Firm*—McCormick, Paulding & Huber

[57] ABSTRACT

A discharge capacitor having an energy density of at least 0.4 J/cm$^3$, perferably for defibrillators, comprising at least one plastic dielectric foil and two electrically conductive armatures (4) separated by the plastic foil is rolled up and enclosed in a housing (60) and has an operating voltage in the range of 600 V to 6000 V and an electric energy accumulation capacity of 10 J to 500 J. Each armature (4) coacts with at least one of the plastic foils (6, 7, 86, 87, 88). Each armature is formed by a metallization (4) and is applied to a paper foil (5) impregnated with a liquid dielectric to provide a regenerating capacity. The impregnated foil is superimposed upon one of the plastic foils so that the capacitor takes the form of a regenerating (self-curing) capacitor.

19 Claims, 3 Drawing Figures

DISCHARGE CAPACITOR OF HIGH ENERGY AND HIGH DIRECT VOLTAGE

The present invention relates to a discharge capacitor of high energy and high direct voltage, preferably for defibrillators, comprising at least one plastic foil and two electrically conductive armatures separated by the said foil, which arrangement is rolled up and enclosed in a housing, with an operating voltage in the range of between 600 V and 6000 V and an electric energy accumulation capacity of between 10 J and 500 J.

Defibrillator capacitors of this type have been known before, substantially in two different forms. A capacitor of the older design having a capacitance of approx. 45 µF at a voltage of 4200 V, as required for usual defibrillators, i.e. devices for the suppression of fibrillation, uses polyethylene terephthalate foils as a dielectric and has a volume of about 2000 $cm^3$ to 3000 $cm^3$ and a weight of about 2.3 kilograms, including the housing and the normally existing liquid dielectric filling.

Such known capacitors have a statistical service life of approx. 10,000 discharges, but a proportion of about 1% of the capacitors becomes unserviceable already after a relatively small number of discharges, for instance 50 discharges. The reason for these failures of the capacitors is to be seen in the fact that the high electrical and mechanical stresses acting on the dielectric due to the high currents and voltages cause a disruptive discharge between the two armatures of the capacitor, and this disruptive discharge leads to the two armatures being short-circuited and very frequently also to damage to the housing, because very high peak pressures occur in the housing. The capacitor may even explode and cause mechanical destructions in the device of which it forms a part. The risk of explosion is not very high for capacitors with an accumulated energy of about 10 J, but it may not be neglected for capacitors with an accumulated energy of about 20 J or more, and it rises as the value of the accumulated energy increases.

Especially in the case of portable defibrillators, the relatively high weight and volume of the capacitor make themselves felt as disadvantages, and there have been successful attempts to reduce the size of the capacitor. Such a capacitor of smaller size has been known from the leaflet "K-FILM DEFIBRILLATOR CAPACITOR INFORMATION, TECH NOTE NO. 111" from Messrs. Capacitor Specialists Incorporated, Escondido, Calif. USA. The known capacitor uses aluminium foils as armatures and a polyvinylidene fluoride as a dielectric. The foil is known under the trademark K-FILM. The advantage of this material is to be seen in its high dielectric constant of 10.4 compared with a value of 3.2 for polyethylene terephthalate. A capacitor of this type therefore requires a volume of about 700 $cm^3$ to obtain a capacitance in the range of about 45 µF at a voltage of 4200 V required for defibrillators capable of accumulating in the capacitor a charge of abt. 400 J. The weight of such a capacitor amounts to abt. 1 kg, including the housing and the liquid filling. However, the high dielectric loss of approx. 30% to 40% of the dielectric has been found to be of disadvantage in such a capacitor. As a result of this loss, considerable amounts of energy must be constantly supplied if the charge of the fully charged capacitor has to be maintained. Otherwise considerable discharging would be encountered within a few seconds only. In addition, it is a requirement of such a capacitor that to ensure full charging of the capacitor, the charger must supply a certain minimum current to ensure that the current supplied by the charger exceeds the amount of current consumed by the dielectric losses.

The described capacitor has a statistical service life of about 5000 discharges, but again there is a rate of early failures of 1%. And there is also the risk of explosion in the event of a disruptive discharge.

In the two known types of defibrillator capacitors whose dielectrics (polyethylene terephthalate or polyvinylidene fluoride) offer disruptive strength of 500 V/µm and 350 V/µm, respectively, the thickness of the plastic foils is selected to ensure that no disruptive discharges will be encountered in operation (except for the before-mentioned early failures and for those cases in which the capacitor has almost reached the end of its service life and may be completely destroyed mechanically as a result of a disruptive discharge).

Now, it is the object of the present invention to provide a discharge capacitor for high direct voltage and high energy of the type described above which does not, for a comparable operating voltage and capacitance, have a volume greater than that of the capacitor described last using polyvinylidene fluoride as a dielectric, but which permits a larger number of discharges and prevents in particular any early failures. In addition, the invention is aimed at reducing the weight.

According to the invention, this object is achieved in that each armature coacts with at least one foil made of a plastic material, including a polyester, including polyethylene terephthalate, that each armature is formed by a metallization having a surface resistance of between 2 and 30 Ohms and applied to a foil or layer which is superimposed upon one of the said plastic foils and which supports the regeneration capacity so that the capacitor takes the form of a regenerating (self-curing) capacitor, that the foil or layer is impregnated with a liquid dielectric, that the thickness of the entire dielectric is selected to ensure that when the operating voltage is applied an average electric field strength of 230 Volts/µm to 360 Volts/µm prevails and that the thicknesses of the individual dielectrics and the liquid dielectric are so selected that the ratio between the field strength and the resistance to disruptive discharges is substantially equal for all dielectrics.

Regenerating metallized paper capacitors have been known for many decades; but they have not been used for d.c. capacitors of high energy, as in the case of the invention.

So, the object to be achieved by the invention can be surprisingly solved by employing the previously used dielectric of the relatively large capacitor described at the outset and by giving the dielectric, under identical operating voltage conditions, a thickness much smaller than that of the known capacitor so that the field strength in the polyester dielectric rises to 300 V/µm or more, while for the known capacitor a field strength of abt. 150 V/µm was provided only. In the case of such a field strength one intentionally takes into account that disruptive discharges will be encountered during normal operation of the capacitor. Depending on the field strength, such a disruptive discharge will, for example, occur in average after 25 charging and discharging processes, while at higher operating voltages a disruptive discharge may occur during each charging process. Considering, however, that the capacitor is designed as a regenerating capacitor, it will not deteriorate as a result of such discharges, and it has even been found surprisingly that such discharges do not even affect the normal function of the unit in which the capacitor is installed. This means that such a disruptive discharge does not notably increase the charging time of the capacitor which would be in the range of 10 sec., for a charging process to 4000 V. And the voltage drop taking place as a result of such a disruptive discharge is also insignificant only, for example from 4000 V to 3990 V. Such a voltage drop is negligible for a capacitor used within a defibrillator. The loss in electric energy amounts to abt. 2 J (Joule), at a capacitance of 45 $\mu$F, and is also negligible with respect to the function.

Since the capacitor is of the self-curing type, it cannot be damaged by disruptive discharges so that the problem of early failures has also been solved. The capacitor has a service life of far more than 10,000 discharging processes which is absolutely sufficient for a defibrillator. The end of the service life of the capacitor does not make itself felt by a sudden failure of the capacitor. Rather, the metallization of the capacitor deteriorates due to the relatively high current which does, however, not exceed 100 A, and the effective capacitance of the capacitor decreases slowly due to the fact that each disruptive discharge results in the destruction of a small portion of the capacitor surface due to the regenerating effect.

Therefore, the capacitor in accordance with the invention may remain installed a long time beyond its envisaged service life in case that a brand-new capacitor should not be available in time for some reason or other.

The electric energy converted into heat during the disruptive discharge at the point of the puncture is so small (in the above example 2 J) that it does not give rise to peak pressures likely to render the housing untight, and this not even if the capacitor housing is completely filled with a liquid dielectric. This is surprising if one considers that the capacitor may have accumulated a very high energy in the range of, say, 400 J and that in conventional capacitors a disruptive discharge may already lead to the destruction of the housing if the accumulated energy is in the range 10 J to 20 J only.

With respect to the capacitor of the invention it seems to be of importance that its design is that of a conventional rolled up capacitor with the two armatures and the plastic foils associated therewith having a very small width compared with their length. In the described example, the width is about 8 cm and the length over 40 m. So, the surface resistance of the metallization provided in accordance with the invention leads to a relatively high mean resistance for the current flowing to the point of the disruptive discharge because this current is forced to flow through the metallization of one layer only. In contrast, the normal discharging and charging currents of the capacitor are supplied or discharged through contacts connected with the longitudinal edges of the metallizations, i.e. through metal layers applied to the end faces of the substantially cylindrical capacitor roll. All resistances of the individual metallizations are in this case connected in parallel so that the total resistance is only small. By associating a plurality of plastic foils with each armature it is also possible to make improved use of the dielectric strength of the dielectric because any defective points present in the dielectric will certainly not be encountered in places exactly superimposing each other so that the number of disruptive discharges can be kept within very narrow limits. Although an individual disruptive discharge certainly does not detrimentally affect the capacitor, the capacitance of the capacitor might deteriorate in the long run if very many disruptive discharges were encountered during each charging process due to one foil being defective.

The surface resistance mentioned before depends on the nature of the metal and the thickness of the metal layer. The surface resistance is specified for a square surface element, the value of the surface resistance being independent of the actual size of the square surface element. The different dielectrics used in the capacitor (for instance polyester and impregnated paper) offer different disruptive strengths which is synonymous with different maximum field strengths. The maximum field strength is defined for the purposes of this description as the field strength at which a disruptive discharge is safely encountered at any point of the dielectric. According to the invention the capacitor is so designed that these different maximum field strengths are substantially utilized to the same degree which means that for instance 80% of that field strength at which the disruptive discharge occurs is applied to each dielectric.

As the high d.c. voltage does not act on the capacitor only momentarily, but normally for several seconds, the ohmic resistance of the dielectrics is apparently also a factor influencing the field strength, obtained in the different dielectrics. This value, which will be described hereafter as insulation resistance, rises with increasing thickness of the dielectric and decreases with increasing surface of the dielectric. As a result of this relationship, when only one dielectric is used in the capacitor, the product obtained by multiplying the insulation resistance by the capacitance of the capacitor is a matter constant which does, however, largely depend on the measuring conditions, for instance the temperature and the voltage. When a specific capacitor is produced using this dielectric, then the surface and the thickness of the dielectric and, thus, the capacitance that would be obtained if both sides of the dielectric were covered with electrically conductive coatings, determine the insulation resistance which is measured in Ohms or Megohms. The matter constant mentioned before will be described herein as specific insulation resistance.

The influence which the insulation resistance has on the distribution of the field strength in the capacitor becomes obvious if one thinks of a capacitor, the dielectric of which consists for instance of a polyester foil and a paper layer, as being a series connection of two capacitors in which the dielectric of the one capacitor consists of polyester only and the dielectric of the other capacitor consists of paper only and in which there is connected in parallel to each capacitor a resistance which corresponds to the insulation resistances of the specific polyester layer and the specific paper layer, respectively. These likewise series-connected resistances of the equivalent circuit diagram influence the voltage distribution at the capacitors and, thus, the electric field strength in the different dielectrics.

It has been found to be of advantage to select the dielectrics and their thickness so that the relation between the maximum field strength (as defined above) of each dielectric to the insulation resistance (as defined above) is substantially equal for the different dielectrics. If this condition is fulfilled the desired uniform utilization of the disruptive strength of the different dielectrics is obtained. The values of the specific insulation resistances known from the existing literature are valid for very low voltages in the range of a few Volts. But when the encountered field strength approaches the maximum field strength, as in the case of the capacitors of the invention, the value of this specific insulation resistance is only a fraction of the value valid for low voltages. It is not certain whether the factor of this decrease of the specific insulation resistance is equal for the different dielectrics in the capacitor. In the case of the capacitor described in the example, the disruptive strength or maximum field strength of the dielectrics is utilized to abt. 80%. The fact that disruptive discharges are rarely encountered seems to indicate that in the presence of very high field strengths the reduction factor of the specific insulation resistance is sufficiently equal for the purposes of the present use. The reduction of the insulation resistance at high field strengths occurs already during the charging of the capacitor. When the field strength in any one of the dielectrics approaches the disruptive field strength, its insulation resistance decreases thus causing the field strength at the other dielectric to rise more quickly. This becomes obvious when regarding the before-mentioned equivalent circuit diagram. Consequently, the before-mentioned voltage dependence of the insulation resistances ensures during the charging process that the relations between the actual field strength and the maximum field strength of the different dielectrics do in any case not differ so greatly that the purpose of the invention would no longer be achieved. The closer the field strength gets to the maximum field strength, the smaller the insulation resistance becomes.

Altogether, the capacitor of the invention offers the advantage of a small dielectric loss in the range of abt. 0.1 to 0.5%, as compared with the capacitor described at the outset using polyvinylidene fluoride as a dielectric. In particular during operation from accumulators—an operation mode which is usual for defibrillators—an increased number of shocks may be derived from one single accumulator charge. As compared to the other known capacitors described above which use polyethylene terephthalate as a dielectric, the capacitor of the invention offers the advantage of a considerably higher energy density, i.e. a much smaller volume.

Another advantage of the capacitor of the invention over the known discharge capacitors is to be seen in its lower weight. For the known capacitors use separate metal foils as armatures, and these metal foils are much thicker and, thus, much heavier than a metallization.

The layer favoring the regeneration comprises preferably cellulose or is produced on the basis of cellulose compounds. Materials of this type include, for instance, cellulose acetobutyrate or cellulose acetate. Such materials resist the high temperatures which are encountered during a disruptive discharge even within a certain circle around the puncture at the point where the metallization vaporizes. A polyester foil, however, would not be suited as base for the metallization as it would be damaged by the disruptive discharge.

In certain embodiments of the invention, the armature consists of the metallization of a metal paper. The metal paper consists conventionally of varnished paper with zinc or aluminium applied thereon by vaporization, and is impregnated with the liquid dielectric, preferably a silicone oil. Silicone oil has been found to be particularly favourable as is keeps the number of disruptive discharges occurring during normal operation within reasonable limits. In contrast, other tests carried out for instance with castor oil have shown that this material gives rise to a great number of disruptive discharges.

Although the individual disruptive discharges do not detrimentally affect the capacitor, one still normally tries to keep the number of such disruptive discharges relatively low because each such disruptive discharge produces a noise which though being not very loud is still heard.

The advantage of this embodiment using metallized paper is seen in the fact that the paper serving as base for the metallization, i.e. varnished paper, can resist quite elevated temperatures so that it provides high safety against the capacitor getting damaged when a disruptive discharge occurs. The use of metallized paper for the two armatures provides high regenerating safety, which means that the capacitor cures itself in the case of punctures by the fact that the metallic layer of the metallic paper vaporizes in the neighborhood of the puncture. By using at least two, preferable exactly two, plastic foils made of the stated dielectric it is possible to increase the puncturing safety considerably as compared to the use of only one foil, because there exists little probability that defects will be found in the plastic foils at exactly the same points.

A surface resistance range of abt. 2 to abt. 15 Ohms permits the realization of capacitors suited for external defibrillation, with a stored energy of abt. 400 J. These capacitors may take the form of individual rolls or several rolls connected in parallel. The total capacitance of such capacitors is in the range of 10 to 50 $\mu$F, and the applied d.c. voltage is in the range of abt. 4000 V to 6000 V. In certain cases, as in the case of internal defibrillation, d.c. voltages as low as 600 V may, however, also be used. If more than one capacitor roll or complete capacitors are connected in parallel to provide the said stored energy of abt. 400 J, this may be done without any particular energy-separating measures so that the capacitor rolls or capacitors may be interconnected by thick wires.

It may be advantageous to use surface resistances of maximally 30 Ohms for the metallizations. In this case, the marginal areas of the metallizations at the junction points to a sprayed-on metal layer for the connection to the connecting wires should conveniently be given a somewhat greater thickness and also a surface resistance of between 2 and 15 Ohms.

A maximum of advantages, as compared to the prior art, is offered by the invention presumably in the stored-energy range of between 200 J and 500 J. Capacitors suited for this energy range are required for external defibrillation for adults. However, the invention is also applicable for capacitors of a storable energy of between 50 J and 200 J. Such capacitors are required for external defibrillation for children and for cardioversion, that is the treatment of disturbances of rhythm other than ventricular fibrillation. Finally, the invention is also suited for capacitors having a stored-energy range of between 10 J and 50 J, as required for internal defibrillation, i.e. implanted defibrillators.

The energy density achievable with a capacitor using metallized paper and two plastic foils, as described above, with a paper and foil thickness of 6 $\mu$m each, is in the range of 1.2 J/cm$^3$. For example, a capacitor comprising two rolls of 11 $\mu$F each, which are electrically connected in parallel, offers an electric energy of 400 J, at a voltage of 6 kV, and can be accommodated in a housing of 350 cm$^3$. Its weight amounts to abt. 510 grams.

The same constructive setup, but with a reduced thickness of the different dielectrics, permits capacitors for implantable defibrillators with the following properties to be implemented, with equal energy density: A stored energy of between 10 J and 50 J (preferably 20 J to 50 J) and capacitance and voltage values that can be largely selected at desire.

Preferably, the capacitor of the invention uses two plastic foils, and the thickness of the paper (varnished paper), and that of each plastic foil amounts to 6 μm. The thickness of the zinc metallization amounts in this case to abt. 0.01 to 0.02 μm to obtain the specified surface resistance of abt. 2 to 15 Ohms. The energy density that can be obtained with such a capacitor, at operating voltage, ranges between 0.5 J/cm$^3$ and 1.2 J/cm$^3$. While in this embodiment of the invention the dielectric exhibits, accordingly, a total thickness of abt. 18 μm, which assuming a voltage of abt. 6000 V gives an average field strength over the whole dielectric of 333 V/μm, the load of commercially available capacitors is below 150 V/μm. This means that the invention permits the dielectric strength of the dielectric to be far better utilized than in the case of the prior art.

The embodiments of the invention discussed before in which the surface resistance amounts to abt. 2 to 15 Ohms, uses preferably a range of between 5 to 10 Ohms because the latter is particularly easy to implement from a technical point of view. In the case of the before-described embodiments with a surface resistance of between 2 and 15 Ohms, one ensures by selecting this surface resistance that the energy consumed for self-curing of the metallization remains small and has no destructive effect. The load capacity and/or the service life of the capacitors of these embodiments of the invention, expressed by the number of charging and discharging cycles, is limited. Corresponding calculations and experiments lead to a limit peak current of abt. 100 A and a possible pulse number of abt. 100,000, for a surface resistance of abt. 2 to 15 Ohms and the before-mentioned approximate capacitances of the capacitors. Beyond these load and pulse limits, a considerable deterioration of the metallization and, thus, reduction in capacitance is encountered. It is, however, a known fact in connection with defibrillators that a peak current of the capacitor of 100 A is never reached and that 20,000 pulses or shocks represent an absolutely satisfactory service life.

Hereafter, the invention will be explained in detail by way of certain examples of capacitors and capacitor batteries, with reference to the drawing which shows certain details essential to the invention, it being understood that the individual features can be incorporated in any embodiment of the invention either alone or in any desired combination.

Figure 1:
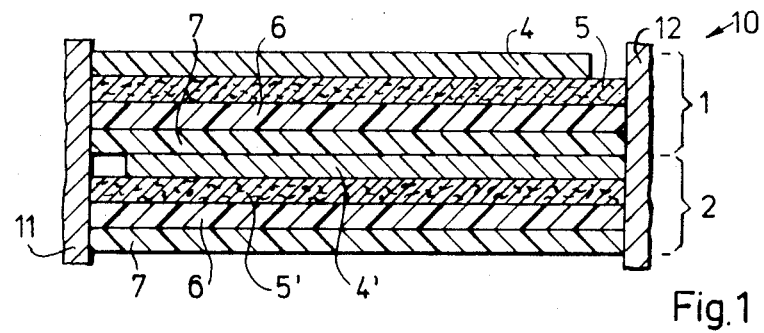
FIG. 1 shows a cross-section through the two multiple layers of an individual capacitor which in the rolled-up condition form the capacitor

FIG. 1 shows two absolutely identical multiple layers 1 and 2. Each multiple layer comprises a paper 5 or 5' provided with a zinc metal layer 4 or 4', and two plastic foils 6 and 7 of polyethylene terephthalate. The paper 5,5' provided with the metal layer 4, 4' is a so-called metallized paper. The paper 5, 5' itself is a varnished paper. The varnish coat consists of cellulose acetate, but cellulose acetobutyrate may also be used. The varnish coat provides a smooth surface and has a thickness of 0.5 μm. The metal layer 4 does not extend up to the right-hand lateral edge of the paper 5, but it does extend to the left-hand edge. On the other hand, the metal layer 4' extends to the right-hand edge of the paper 5', but does not extend to the left-hand edge. The distance on either side amounts to 3 mm. The papers 5, 5' and the plastic foils 6 and 7 are equal in width. The right and left end faces in FIG. 1 of the capacitor 10 formed by rolling up the multiple layers 1 and 2 are provided with sprayed-on metal coatings 11 or 12 of zinc which are in contact with the metal layers 5 and 5' and to which connection wires can be fastened by soldering. The metal layer 4, 4' has a surface resistance of 7.5 Ohms and a thickness of 15 nm (nanometers). Below the zinc coat, there is provided a silver coat of 0.2 to 0.5 nm thickness. The dry paper has a specific insulation resistance of 10,000 to 15,000 Megohms × microfarad (measured at low field strength). Impregnated with silicone oil, it has a specific insulation resistance of abt. 25,000 Megohms × microfarad. The maximum field strength amounts to abt. 250 V/μm. The specific insulation resistance of the polyester used is 50,000 Megohms × microfarad. The paper layer 5, 5' and the two plastic layers 6 and 7 have a thickness of 6 μm each. Due to this relatively high surface resistance the peak currents encountered in the case of a puncture are so efficiently reduced that the capacitor battery shown in FIG. 2 does not need any particular energy-separation measures, i.e. no resistances or inductances. The width of the paper layer and the plastic layers visible in FIG. 1 is 80 mm in the example shown in the drawing, the length which is not visible in the drawing amounts to 48 m. In the rolled-up condition, with the layers being in close contact to each other and the finished capacitor being filled with a liquid dielectric, i.e. silicone oil, the capacitor roll has a capacitance of 11 μF. A self-adhesive polyester tape of abt. 70 μm thickness wound around the capacitor roll prevents the roll from getting loose unwantedly. During rolling of the capacitor, the foils are stretched at a force of 20 to 25 N (Newton).

The dielectric constant of the polyethylene terephthalate is 3.2, the dielectric constant of the paper impregnated with the liquid dielectric is 4.8. The mixed dielectric thus formed has altogether a mean dielectric constant of 4.2.

To form the finished individual capacitor or capacitor roll 10, the multiple layers 1 and 2 are wound up around a plastic mandrel 15. In the embodiments shown this mandrel is formed by a plastic tube and is thus hollow. The individual capacitor 10 may be installed in a housing singly.

Figure 2:
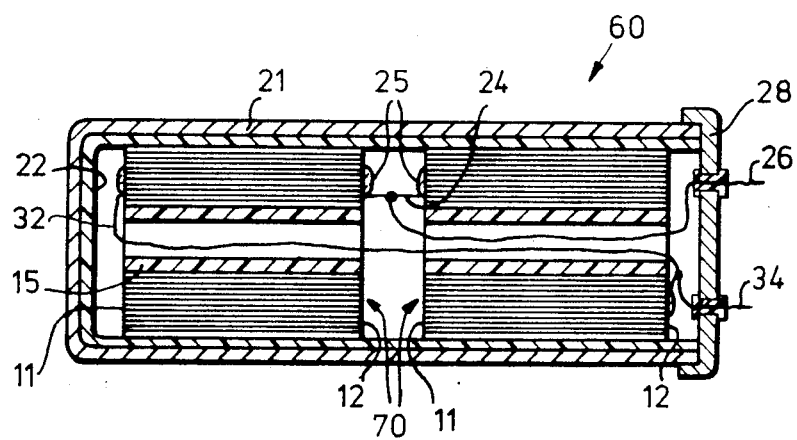
FIG. 2 shows a longitudinal section through a capacitor battery comprising two individual capacitors in a metal housing.

In the embodiment shown in FIG. 2, however, two individual capacitors 10 with an interposed insulating layer 22 are installed in a common housing 60 formed by a drawn metal cup 21 of aluminium. The metal layers 11 and 12 of the two individual capacitors 10 which face each other in the central area of the housing 60 are interconnected by means of the connection wire 24 and soldering points 25. A line 26 is connected with the line 24 and passed through the mandrel 15 in the right-hand capacitor 10 in FIG. 2, then to the right and outwardly through a connection socket in a metal cover 28 closing the housing 60, the socket being mounted in an insulated manner. The metal layer 11 of the left individual capacitor 20 is connected with the metal layer 12 of the right individual capacitor 10 through a connection line 32 extending through both mandrels 15, and guided outwardly to the connection point 34 through the cover 28.

The capacitor battery 20 is installed in the metal cup 21, and the housing is filled with the liquid dielectric 36, the filling being done in the conventional manner under vacuum conditions to prevent any air from being trapped in the paper. Thereafter, the cover 28 is applied in tight relationship. The connection lines within the housing are sufficiently long to get into contact with the cover carrying the connections 26 and 34 before the cover is closed. Now, the capacitor battery 20 is ready for use and may be connected to a d.c. source of any polarity. The resistance of the connection lines within the housing is negligible.

The housing of the capacitor shown in FIG. 2 has a diameter of 50 mm, a length of 180 mm. The total weight is 510 g. Its capacitance amounts to 22 $\mu$F. The energy density, related to the weight, amounts to 0.77 J/g at an operating voltage of 6000 V, and is notably higher than in conventional capacitors using a polyester dielectric. At an operating voltage of 5,700 V, disruptive discharges will rarely (after 25 discharges in average) be encountered; at an operating voltage of 6,500 V at least one disruptive discharge will be encountered per charging process. The silicone oil used is Methylpolysiloxan 47V100 from Messrs. Rhone-Poulenc, France.

The capacitor has an average field strength of 333 V/$\mu$m at an operating voltage of 6,000 V. The field strength prevailing in the paper is equal to 150 V/$\mu$m, that prevailing in the polyester is equal to 400 V/$\mu$m. These values have been determined by measuring techniques.

A modification of the capacitor shown in FIGS. 1 and 2 uses two plastic layers of the same polyester and a thickness of 4 $\mu$m each instead of the two plastic layers of 6 $\mu$m each. Then, the field strength encountered in the paper is equal to 200 V/$\mu$m and that in the plastic is equal to 400 V/$\mu$m at an operating voltage of 4,400 V. In this case, the maximum field strength of both dielectrics is utilized to 80%. This capacitor has a capacitance of 40 microfarad, and accumulates an energy of approx. 400 J at the mentioned voltage.

The volume of the capacitor, including the housing, may be expected to be abt. 10 to 15% larger than the volume of the capacitor roll. In the example shown in FIGS. 1 and 2 the described capacitor with the plastic foils of 6 $\mu$m thickness each has an energy density of abt. 1 J/cm$^3$ at the operating voltage of 5,700 V. The modified capacitor with plastic foils of 4 $\mu$m thickness each has an energy density of abt. 1.1 J/cm$^3$, at the stated operating voltage of 4,400 V.

Figure 3:
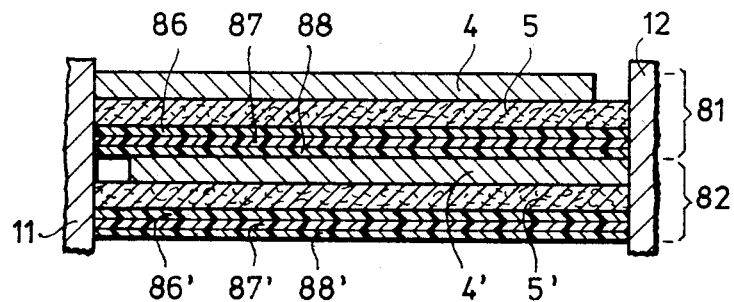
FIG. 3 shows as representation similar to FIG. 1, of another capacitor.

The capacitor shown in FIG. 3 is provided with three foils 86, 87, 88 of the same material and a thickness of 2 $\mu$m each, instead of the two foils 6,7 according to FIG. 1. In this arrangement the multiple layers are indicated by the reference numbers 81 and 82. This modification distinguishes itself electrically from the capacitor of FIG. 1 only by its capacitance of 50 $\mu$F, its operating voltage of 4,000 V and its energy of 400 J. It seems possible to substitute other plastic materials for the polyethylene terephthalate or other polyesters.

The examples described above are not meant to restrict, but rather to illustrate the invention. In particular, it seems possible with the invention to achieve a higher energy density than that given in the examples.

In all the examples the plastic material is polyethylene terephthalate.

The reference numerals in the claims are not a restriction, but they shall facilitate comprehension.

We claim:

1. A discharge capacitor having an energy density of at least 0.4 J/cm$^3$, preferably for difibrillators, comprising a housing (60), at least one dielectric foil and two electrically conductive armatures (4) separated by said dielectric foil, said dieletric foil and conductive armatures being rolled up and enclosed in said housing (60), said discharge capacitor having an operating voltage in the range of between 600 V and 6000 V and an electric energy accumulation capacity of between 10 J and 500 J, said discharge capacitor characterized in that each armature (4) coacts with a first dielectric foil (6, 7, 86, 87, 88) each comprising a plastic material, including a polyester, including polyethylene terephthalate, each armature being formed by a metallization (4) having a surface resistance of between 2 and 30 Ohms and being applied to a second dielectric foil (5) impregnated with a liquid dielectric, said impregnated dielectric foil providing a regenerating capacity and being superimposed on said first dielectric foil so that the capacitor takes the form of a regenerating (self-curing) capacitor, each of said first and second dielectric foils having a predetermined thickness and being arranged in a layer to form said dielectric foil separating said conductive armatures, said dielectric foil thickness being selected to ensure that when the operating voltage is applied an average electric field strength of 230 volts/$\mu$m to 360 volts/$\mu$m prevails, and the predetermined thickness of said first and second dielectric foils being selected so that the ratio between the strength of an electric field associated with the applied operating voltage and the disruptive strength associated with a dielectric is substantially equal for each of said first and second dielectric foils.

2. A capacitor in accordance with claim 1, characterized in that said first and second dielectric foils and their respective thicknesses are selected so that the ratio between the disruptive strength associated with a dielectric and the insulation resistance associated with said dielectric is substantially equal for each of said dielectric foils.

3. A capacitor in accordance with claim 1, characterized in that the housing (60) is filled with a liquid dielectric (36).

4. A capacitor in accordance with claim 1, characterized in that said second dielectric foil (5) comprises a cellulose material, including celluose acetobutyrate.

5. A capacitor in accordance with claim 4, characterized in that the armature is formed by the metallization (4) of a metallized paper (4,5).

6. A capacitor in accordance with claim 1, characterized in that two first dielectric foils (6, 7) are associated with each of said armatures.

7. A capacitor in accordance with claim 6, characterized in that the thickness of said second dielectric foil (5) and each of said first dielectric foils (6, 7) is about 6 $\mu$m.

8. A capacitor in accordance with claim 1, characterized in that at least three first dielectric foils (86, 87, 88) are associated with each of said armatures.

9. A capacitor in accordance with claim 1, characterized in that the surface resistance of the metallization (4) is between 5 Ohms and 10 Ohms.

10. A capacitor in accordance with claim 1, characterized in that the surface resistance of the metallization is between 10 Ohms and 30 Ohms and the metallization comprises a thicker marginal area having a surface resistance in the range of 5 Ohms to 10 Ohms.

11. A capacitor in accordance with claim 1, characterized in that its operating voltage is abt. 4200 V, its capacity abt. 45 μF and the accumulated energy abt. 400 J.

12. A capacitor in accordance with claim 1, characterized in that the liquid dielectric (36) is a silicone oil.

13. A capacitor in accordance with claim 1, characterized by a storable energy in the range of 10 J to 50 J.

14. A capacitor in accordance with claim 1, characterized by a storable energy in the range of 50 J to 200 J.

15. A capacitor in accordance with claim 1, characterized by a storable energy in the range of 200 J to 500 J.

16. A capacitor in accordance with claim 6, characterized in that the thickness of the metallized paper (4) is about 6 μm, and the thickness of each of said first dielectric foils is about 4 μm.

17. A capacitor in accordance with claim 8, characterized in that the thickness of the metallized paper (4) is about 6 μm, and the thickness of each of said first dielectric foils (86, 87, 88) is about 4 μm.

18. A capacitor in accordance with claim 1 further characterized in that said second dielectric foil comprises a cellulose material including cellulose acetate.

19. A capacitor in accordance with claim 1 further characterized in that said second dielectric foil is formed by applying a second dielectric material to said first dielectric, said second dielectric material being different than said first dielectric material.

* * * * *